US007424697B1

(12) United States Patent
Arslan et al.

(10) Patent No.: US 7,424,697 B1
(45) Date of Patent: Sep. 9, 2008

(54) ASSIGNING INPUTS OF LOOK-UP TABLES TO IMPROVE A DESIGN IMPLEMENTATION IN A PROGRAMMABLE LOGIC DEVICE

(75) Inventors: Hasan Arslan, Santa Clara, CA (US); Anirban Rahut, Sunnyvale, CA (US)

(73) Assignee: XILINX, Inc., San Jose, CA (US)

( * ) Notice: Subject to any disclaimer, the term of this patent is extended or adjusted under 35 U.S.C. 154(b) by 86 days.

(21) Appl. No.: 11/707,317

(22) Filed: Feb. 16, 2007

(51) Int. Cl.
G06F 17/50 (2006.01)

(52) U.S. Cl. .......................................... 716/16; 716/10
(58) Field of Classification Search ............. 326/37–41, 326/47; 716/6, 10, 16
See application file for complete search history.

(56) References Cited

U.S. PATENT DOCUMENTS

| 6,763,506 | B1 * | 7/2004 | Betz et al. ....................... 716/6 |
| 6,766,504 | B1 * | 7/2004 | Rahut et al. .................... 716/13 |
| 7,058,915 | B1 * | 6/2006 | Singh et al. .................... 716/10 |
| 7,152,217 | B1 * | 12/2006 | Srinivasan .................... 716/13 |
| 2004/0250226 | A1 * | 12/2004 | Lin et al. ....................... 716/7 |

OTHER PUBLICATIONS

Larry McMurchie et al.; "PathFinder: A Negotiation-Based Performance-Driven Router for FPGAs"; published 1995; pp. 1-7.
Yuzheng Ding et al.; "The Effect of Post-Layout Pin Permutation on Timing"; FPGA '05, Feb. 20-22, 2005; Copyright 2005 ACM; pp. 41-49.

* cited by examiner

*Primary Examiner*—Rexford Barnie
*Assistant Examiner*—Christopher Lo
(74) *Attorney, Agent, or Firm*—LeRoy D. Maunu (57) ABSTRACT

Methods for improving an implementation of a design in a programmable logic device (PLD). A topological level of the design implementation is determined for each look-up table (LUT) of the PLD. A subset of the LUTs that are on the critical timing paths of the design implementation is determined. For each LUT in the subset at each topological level, a set combinations is determined for assigning signals to the inputs of the LUT. A current assignment of the signals to the LUT inputs is initialized according to the design implementation. For each LUT in the subset at each topological level, the method determines whether a respective assignment for each combination in the set for the LUT improves a timing metric for the LUT relative to the current assignment for the LUT, and the current assignment is updated when the respective assignment improves the timing metric for the LUT.

20 Claims, 8 Drawing Sheets

ASSIGNING INPUTS OF LOOK-UP TABLES TO IMPROVE A DESIGN IMPLEMENTATION IN A PROGRAMMABLE LOGIC DEVICE

FIELD OF THE INVENTION

The present invention generally relates to generation of an implementation of a design in a programmable logic device.

BACKGROUND

Programmable logic devices (PLDs) may be configured to implement a variety of user designs. A programmable logic device may include programmable logic resources and programmable interconnect resources. Logic components of a user design may be mapped to the programmable logic resources and connections between the mapped logic components may be routed through the programmable interconnect resources.

The programmable logic resources of a PLD may include look-up tables (LUTs). An example LUT may have four 1-bit input signals and one 1-bit output signal, and may be configured to implement any logic function of four or fewer inputs. For example, the LUT may be configured to implement the function of a 4-input NAND gate, a 4-input OR gate, a 4-input XOR gate, or a 3-input AND gate. Thus, for a specific logic component of a user design that is a function of up to four inputs, the implementation of the user design may map the specific logic component to a particular LUT of the PLD.

The programmable interconnect resources of the PLD may connect the logic components of the user design that are mapped to the programmable logic resources. After the logic components of the user design are mapped to the programmable logic resources of the PLD, connections between the logic components in the programmable logic resources may be routed through the programmable interconnect resources.

In one heuristic approach for routing a mapped user design, a first phase may route each connection through the programmable interconnect resources without regard to whether each programmable interconnect resource is already used by another connection. A second phase of routing may eliminate any overlapping usage by multiple connections of a programmable interconnect resource.

A cost function may be used during the elimination of overlapping usage of the programmable interconnect resources. The cost function may, for example, be primarily based on a predicted operating frequency for the implementation of the design in the programmable logic device. A contribution to the cost function may be gradually increased for each programmable interconnect resource with overlapping usage. After each such increase, the implementation may be incrementally modified to reduce the cost function, and these incremental modifications will tend to eliminate overlapping resource usage. The routing may be completed when the gradual increase in the cost of overlapping resources causes the incremental modification to eliminate all of the overlapping usage of the programmable interconnect resources.

Overlap removal is a heuristic that tends to eliminate overlapping usage by multiple connections of programmable interconnect resources by moving the less timing critical connections to other programmable interconnect resources. Because heuristics are used in this approach to generating an implementation of a user design, further improvements of the implementation are frequently possible.

The present invention may address one or more of the above issues.

SUMMARY OF THE INVENTION

Various embodiments of the invention provide a method implemented by a processor for improving an implementation of a design in a programmable logic device (PLD). A topological level of the implementation of the design is determined for each of the look-up tables (LUTs) of the PLD. A subset of the LUTs is determined that includes the LUTs that are on the critical timing paths of the implementation of the design. For each LUT in the subset at each topological level, a set of combinations is determined for assigning signals to the inputs of the LUT. The signals for a LUT are the signals that are coupled in the implementation of the design to the inputs of the LUT. A current assignment of the signals to the LUT inputs is initialized in correspondence with the implementation of the design. For each LUT in the subset at each topological level, the method determines whether a respective assignment for each combination in the set for the LUT improves a timing metric for the LUT relative to the timing metric of the current assignment for the LUT, and the current assignment for the LUT is updated when the respective assignment improves the timing metric for the LUT.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
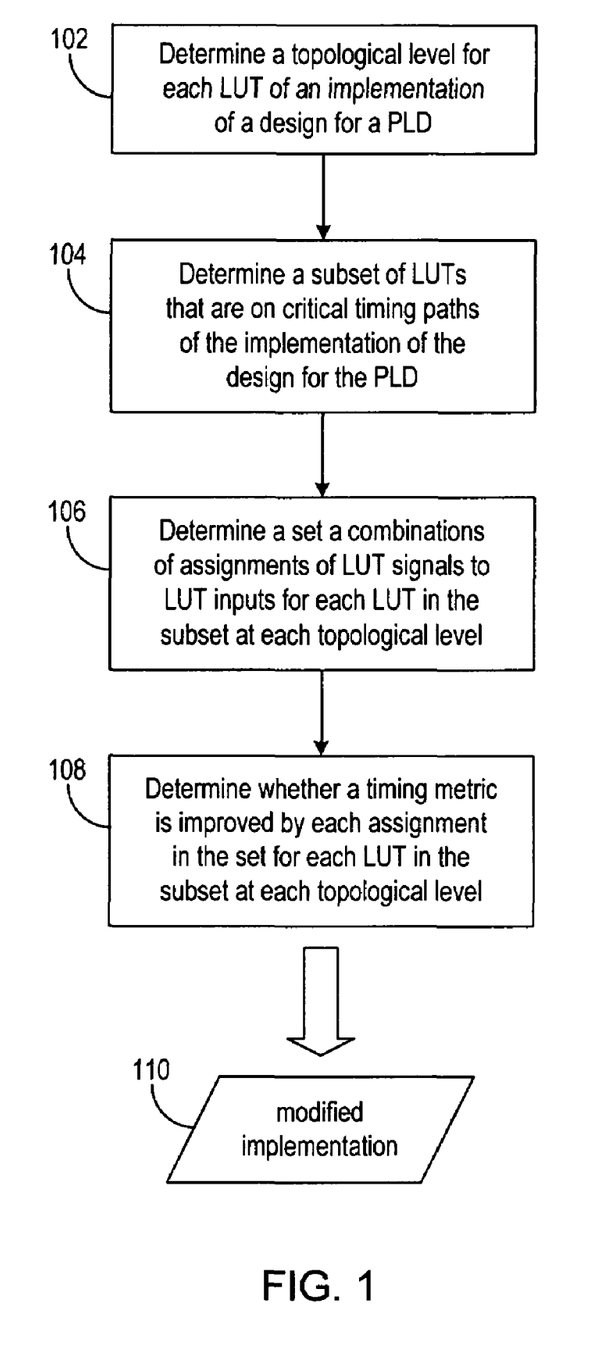
FIG. 1 is a flow diagram of a process for improving an implementation of a design in a programmable logic device in accordance with various embodiments of the invention.

FIG. 1 is a flow diagram of a process for improving an implementation of a design in a programmable logic device (PLD) in accordance with various embodiments of the invention. The design may be implemented in the PLD using programmable logic and interconnect resources that include programmable look-up tables (LUTs). Tools, such as place and route tools, may map the design to an implementation of the design in the programmable logic and interconnect resources of the PLD. Inputs of certain LUTs may be swapped in various embodiments of the invention to improve a circuit timing of an existing implementation of the design in the PLD. The programming of the LUTs with swapped inputs may be changed to compensate for the swapped inputs.

At step 102, a topological level is determined within the design for each LUT used by an existing implementation of the design. The implementation may include registers and design inputs, and the topological level of a particular LUT may be the number of LUTs along a longest path from the registers and the design inputs to the particular LUT. The topological level may be determined from a breadth first search of a graph representing the existing implementation of the design.

For a LUT within a specific topological level, the inputs of the LUT may be swapped for a LUT to improve circuit timing of the implementation without affecting the circuit timing of any other LUTs within this specific topological level. Thus, efficiency may be improved because circuit timing of the implementation does not need to be recalculated for each LUT that is modified. By processing the LUTs by topological level from the first to the last topological level, circuit timing may need to be recalculated only before processing each topological level of LUTs. It will be appreciated that if no LUTs are modified within a particular topological level, then there may be no need to recalculate the circuit timing for the implementation.

At step 104, the LUTs are determined that are on the critical timing paths of the implementation of the design in the PLD. An implementation of a design in a PLD may have timing objectives, such as a targeted operating frequency for the implementation of the design. An existing implementation of the design may not meet the timing objectives because certain timing paths of the implementation may have a propagation delay that exceeds a specified clock period corresponding to the targeted operating frequency. The timing paths with a propagation delay that exceeds the specified clock period may be selected as the critical timing paths. Various embodiments of the invention may improve the critical timing paths for an existing implementation of the design to produce a modified implementation of the design that may meet the timing objectives.

It will be appreciated that there are other ways to determine the critical timing paths. For example, the critical timing paths may the timing paths with a propagation delay that exceeds a limit on the propagation delay. The limit may be selected such that there are a specific number of critical timing paths. The specified number of critical timing paths may be a fixed number or may be determined as a function of the complexity of the design.

At step 106, various combinations of swapped inputs for certain LUTs may be determined. The signals for a LUT may be the signals that are connected to the inputs of the LUT in the existing implementation of the design, and each combination of swapped inputs may be an assignment of the signals to the inputs of the LUT. The LUTs processed may be on one or more of the critical timing paths and these LUTs may be processed by topological levels from the first to the last topological level. Efficiency may be improved by pruning certain combinations of swapped inputs for a LUT because these combinations cannot improve the circuit timing of the implementation.

At step 108, for each LUT on a critical timing path processed in an order according to topological level, each assignment generated in step 106 is checked to determine whether the assignment improves a timing metric for the implementation of the design. For example, the assignment may improve timing because the assignment may move a timing critical signal from one input of the LUT to a faster input of the LUT. The implementation of the design may be modified to appropriately swap inputs for each assignment that does improve the timing metric. Once all the levels have been processed, the modified version of the implementation 110 is output for further analysis or deployment.

In one embodiment of the invention, the existing implementation of the design is incrementally improved. For each LUT on a critical path and at a current topological level, the implementation is modified to swap inputs according to any assignment that improves timing. After processing all of the LUTs on the critical paths at the current topological level, the circuit timing of the modified implementation may be recalculated before processing the LUTs at the next topological level. Generally, the recalculated timing may affect the pruning of the combinations of assignments determined at step 106 for the next level, and the recalculated timing of the modified implementation may change or eliminate certain of the critical timing paths determined at step 104.

Figure 2:
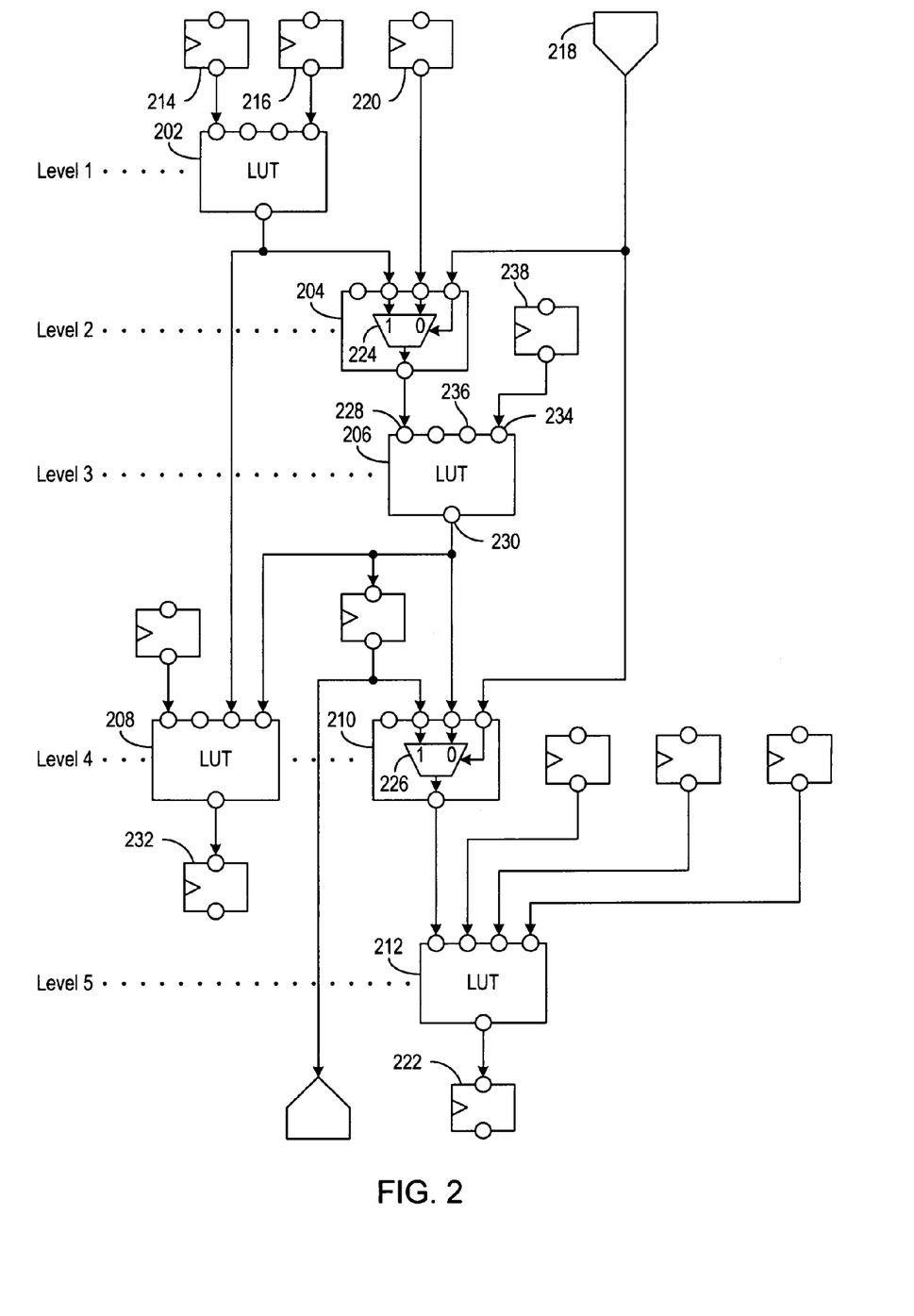
FIG. 2 is a block diagram of an implementation of an example design in a programmable logic device in accordance with various embodiments of the invention.

FIG. 2 is a block diagram of an implementation of an example design in a programmable logic device (PLD) in accordance with various embodiments of the invention. The implementation of the example design illustrates levels of LUTs 202 through 212 and also illustrates a false timing path. Tools for analyzing and/or improving the circuit timing of an implementation of a design, such as various embodiments of the invention, should appropriately handle a design that includes false paths.

LUT 202 is at level one because the inputs of LUT 202 are only connected to registers 214 and 216. While LUT 204 is connected to a register 220 and design input 218, LUT 204 is at level two because an input of LUT 204 is connected to an output of LUT 202, which is at level one. Similarly, LUT 206 is at level 3, LUTs 208 and 210 are at level 4, and LUT 212 is at level 5.

A long path starts at registers 214 or 216, goes through LUT 202, connects from the output of LUT 202 to an input of LUT 204, and similarly continues through LUTs 206, 210, and 212 to register 222. Frequently, a long path is a critical timing path; however, in this example design the long path is not a critical timing path because the long path is a false path.

A false path may be a circuit path that cannot be exercised. LUTs 204 and 210 are programmed to implement multiplexers 224 and 226 controlled by design input 218. To exercise the long path through LUTs 202, 204, 206, 210, and 212, design input 218 should be asserted to select the appropriate input of multiplexer 224, and design input 218 should be deasserted to select the appropriate input of multiplexer 226. Because design input 218 cannot be both asserted and deasserted, the long path cannot be exercised. Thus, the long path through LUTs 202, 204, 206, 210, and 212 is a false path.

It will be appreciated that an exercisable circuit path may still be a false path. For example, a design may permit certain circuit paths to be exercised with a propagation delay of more than one period of a clock for the design. Such circuit paths may be denoted multi-cycle paths. For a timing analysis to ensure that the circuit paths have a propagation delay of less than the period of the clock for the design, a multi-cycle path may be a false path.

Frequently, static timing analysis tools are used to identify the critical timing paths of an implementation of a design. Because a static timing analysis may ignore logic situations such as multiplexers 224 and 226 being controlled by the same signal, a static timing analysis may identify certain timing paths as critical timing paths even though the timing paths are actually false paths. A static timing analysis tool may permit explicit specification of false paths that are ignored during identification of the critical timing paths.

In various embodiments of the invention, inputs of a LUT may be swapped or permuted to improve circuit timing. For example, a particular critical timing path may begin at registers 214 or 216, pass through LUTs 202 and 204 to input 228 of LUT 206, and continue from output 230 of LUT 206 through LUT 208 to register 232. LUT 206 may have a propagation delay from input 228 to output 230 that is greater than the propagation delay from either input 234 or unused input 236 to output 230. This particular critical timing path may be improved by swapping the slower input 228 with a faster input 234 of LUT 206. However, swapping inputs 228 and 234 may adversely affect another critical timing path beginning at register 238, so input 228 may instead be swapped with unused input 236 to improve circuit timing. The programming of LUT 206 may be adjusted to compensate for the swapped inputs 228 and 236.

Figure 3:
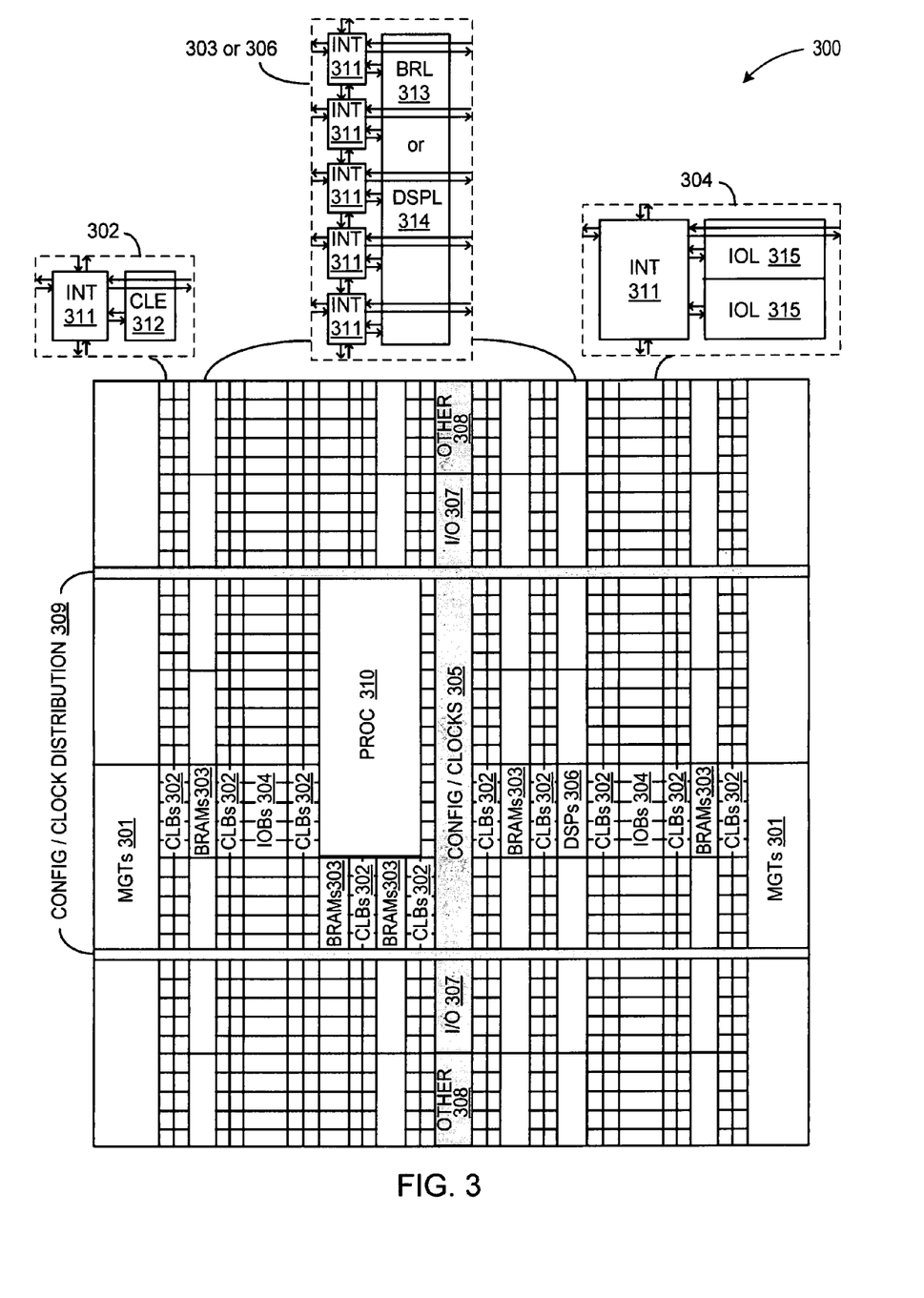
FIG. 3 is a block diagram of a programmable logic device for implementing a design in accordance with various embodiments of the invention.

FIG. 3 is a block diagram of a programmable logic device for implementing a design in accordance with various embodiments of the invention. The design, which is implemented in the programmable logic and routing resources of the PLD, may be improved by permuting the input connections of a look-up table (LUT), such as a LUT included in configurable logic element 312 of one of the configurable logic blocks CLBs 302.

Advanced FPGAs can include several different types of programmable logic blocks in the array. For example, FIG. 3 illustrates an FPGA architecture 300 that includes a large number of different programmable tiles including multi-gigabit transceivers (MGTs 301), configurable logic blocks (CLBs 302), random access memory blocks (BRAMs 303), input/output blocks (IOBs 304), configuration and clocking logic (CONFIG/CLOCKS 305), digital signal processing blocks (DSPs 306), specialized input/output blocks (I/O 307) (e.g., configuration ports and clock ports), and other programmable logic 308 such as digital clock managers, analog-to-digital converters, system monitoring logic, and so forth. Some FPGAs also include dedicated processor blocks (PROC 310).

In some FPGAs, each programmable tile includes a programmable interconnect element (INT 311) having standardized connections to and from a corresponding interconnect element in each adjacent tile. Therefore, the programmable interconnect elements taken together implement the programmable interconnect structure for the illustrated FPGA. The programmable interconnect element (INT 311) also includes the connections to and from the programmable logic element within the same tile, as shown by the examples included at the top of FIG. 3.

For example, a CLB 302 can include a configurable logic element (CLE 312) that can be programmed to implement user logic plus a single programmable interconnect element (INT 311). A BRAM 303 can include a BRAM logic element (BRL 313) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 306 can include a DSP logic element (DSPL 314) in addition to an appropriate number of programmable interconnect elements. An IOB 304 can include, for example, two instances of an input/output logic element (IOL 315) in addition to one instance of the programmable interconnect element (INT 311). As will be clear to those of skill in the art, the actual I/O pads connected, for example, to the I/O logic element 315 typically are not confined to the area of the input/output logic element 315.

In the pictured embodiment, a columnar area near the center of the die (shown shaded in FIG. 3) is used for configuration, clock, and other control logic. Horizontal areas 309 extending from this column are used to distribute the clocks and configuration signals across the breadth of the FPGA.

Some FPGAs utilizing the architecture illustrated in FIG. 3 include additional logic blocks that disrupt the regular columnar structure making up a large part of the FPGA. The additional logic blocks can be programmable blocks and/or dedicated logic. For example, the processor block PROC 310 shown in FIG. 3 spans several columns of CLBs and BRAMs.

Note that FIG. 3 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 3 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 4:
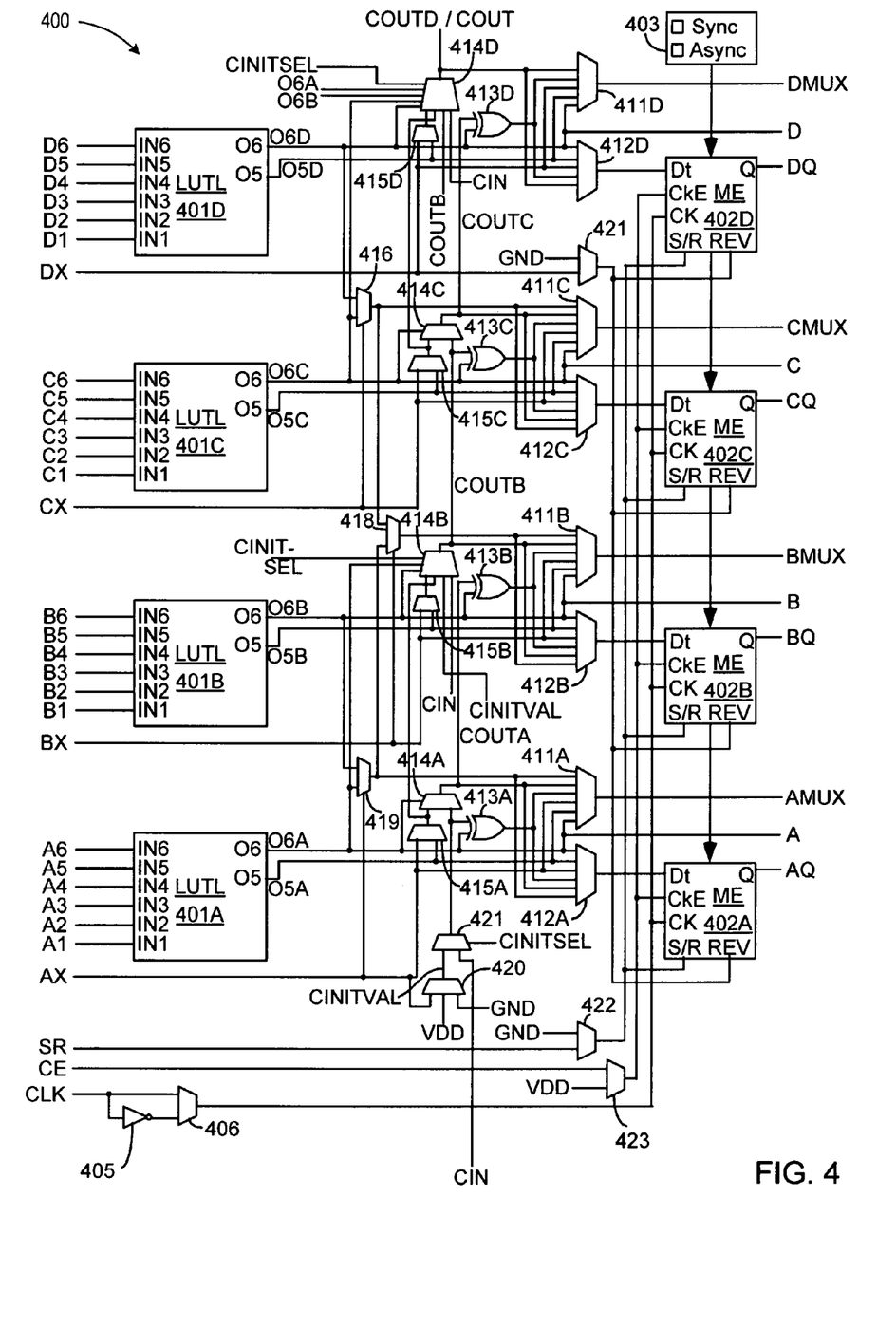
FIG. 4 is a block diagram of logic slice of a programmable logic device for implementing a portion of a design in accordance with various embodiments of the invention.

FIG. 4 is a block diagram of logic slice 400 of a programmable logic device for implementing a portion of a design in accordance with various embodiments of the invention. FIG. 4 illustrates one embodiment of logic slice 400 that can be used, for example, in the FPGA of FIG. 3. In some embodiments, each CLB 302 of FIG. 3 includes two or more copies of slice 400. In other embodiments, only one copy of slice 400 is included in each CLB. In other embodiments, the CLBs are implemented without using slices or using slices other than those shown in the figures herein.

In the embodiment of FIG. 4, slice 400 includes four lookup tables (LUTs) 401A-401D, each driven by six LUT data input terminals A1-A6, B1-B6, C1-C6, and D1-D6 and each providing two LUT output signals O5 and O6. (In the present specification, the same reference characters may be used to refer to terminals, signal lines, and their corresponding signals.) The O6 output terminals from LUTs 401A-401D drive slice output terminals A-D, respectively. The LUT data input signals are supplied by the FPGA interconnect structure (not shown in FIG. 4) via input multiplexers (not shown in FIG. 4), and the LUT output signals are also supplied to the interconnect structure. Slice 400 also includes: output select multiplexers 411A-411D driving output terminals AMUX-DMUX; multiplexers 412A-412D driving the data input terminals of memory elements 402A-402D; combinational multiplexers 416, 418, and 419; bounce multiplexer circuits 422-423; a circuit represented by inverter 405 and multiplexer 406 (which together provide an optional inversion on the input clock path); and carry logic comprising multiplexers 414A-414D, 415A-415D, 420-421 and exclusive OR gates 413A-413D. All of these elements are coupled together as shown in FIG. 4. Where select inputs are not shown for the multiplexers illustrated in FIG. 4, the select inputs are controlled by configuration memory cells. These configuration memory cells, which are well known, are omitted from FIG. 4 for clarity, and from other selected figures herein.

In the pictured embodiment, each memory element 402A-402D can be programmed to function as a synchronous or asynchronous flip-flop or latch. The selection between synchronous and asynchronous functionality is made for all four memory elements in a slice by programming Sync/Asynch selection circuit 403. When a memory element is programmed so that the S/R (set/reset) input signal provides a set function, the REV input terminal provides the reset function.

When the memory element is programmed so that the S/R input signal provides a reset function, the REV input terminal provides the set function. Memory elements 402A-402D are clocked by a clock signal CLK, e.g., provided by a global clock network or by the interconnect structure. Such programmable memory elements are well known in the art of FPGA design. Each memory element 402A-402D provides a registered output signal AQ-DQ to the interconnect structure.

Each LUT 401A-401D provides two output signals, O5 and O6. The LUT can be configured to function as two 5-input LUTs with five shared input signals (IN1-IN5), or as one 6-input LUT having input signals IN1-IN6. Each LUT 401A-401D can be implemented, for example, as shown in FIG. 5.

Figure 5:
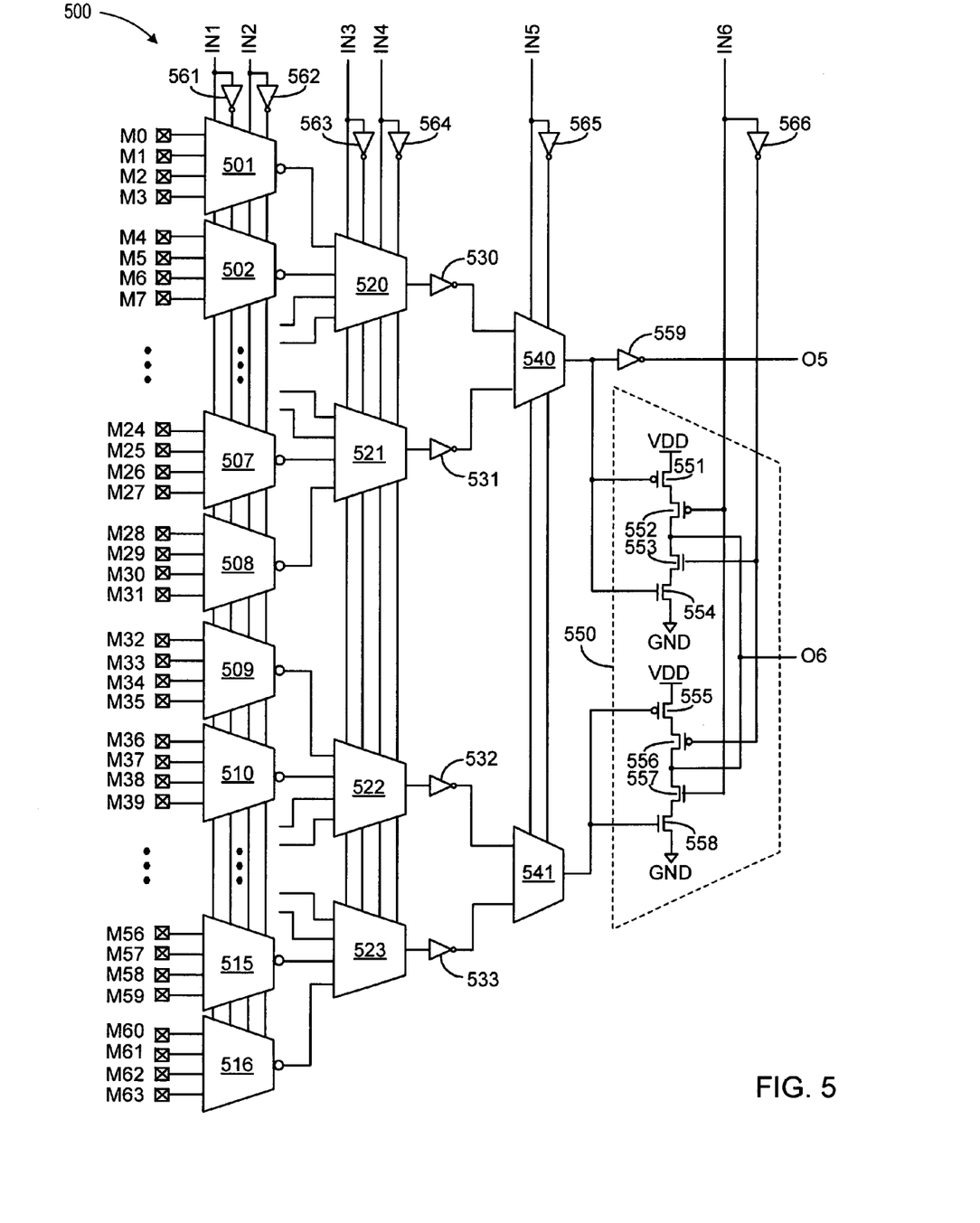
FIG. 5 is a block diagram of look-up table of a logic slice of a programmable logic device for implementing a portion of a design in accordance with various embodiments of the invention.

FIG. 5 is a block diagram of look-up table (LUT) 500 of a logic slice of a programmable logic device for implementing a portion of a design in accordance with various embodiments of the invention.

In the embodiment of FIG. 5, configuration memory cells M0-M63 drive 4-to-1 multiplexers 501-516, which are controlled by input signals IN1, IN2 and their inverted counterparts (provided by inverters 561, 562) to select 16 of the signals from the configuration memory cells. The selected 16 signals drive four 4-to-1 multiplexers 520-523, which are controlled by input signals IN3, IN4 and their inverted counterparts (provided by inverters 563, 564) to select four of the signals to drive inverters 530-533. Inverters 530-533 drive 2-to-1 multiplexers 540-541, which are controlled by input signal IN5 and its inverted counterpart (provided by inverter 565). The output of multiplexer 540 is inverted by inverter 559 and provides output signal O5. Thus, output signal O5 can provide any function of up to five input signals, IN1-IN5. Inverters can be inserted wherever desired in the multiplexer structure, with an additional inversion being nullified by simply storing inverted data in the configuration memory cells M0-M63. For example, the embodiment of FIG. 5 shows bubbles on the output terminals of multiplexers 501-516, which signifies an inversion (e.g., an inverter) on the output of each of these multiplexers.

Multiplexers 540 and 541 both drive data input terminals of multiplexer 550, which is controlled by input signal IN6 and its inverted counterpart (provided by inverter 566) to select either of the two signals from multiplexers 540-541 to drive output terminal O6. Thus, output signal O6 can either provide any function of up to five input signals IN1-IN5 (when multiplexer 550 selects the output of multiplexer 541, i.e., when signal IN6 is high), or any function of up to six input signals IN1-IN6.

In the pictured embodiment, multiplexer 550 is implemented as two three-state buffers, where one buffer is driving and the other buffer is disabled at all times. The first buffer includes transistors 551-554, and the second buffer includes transistors 555-558, coupled together as shown in FIG. 5.

The LUT 500 may look up the value of one of the configuration memory cells M0-M63 based on the values of six input signals IN1-IN6 to generate the output signal O6. A change in one of the input signals IN1-IN6 may produce a change in the output signal O6 after a propagation delay in LUT 500 from the changed input signal to the output signal O6. For a change in output signal O6 caused by a change of input signal IN6, the propagation delay through LUT 500 may be the delay for multiplexer 550 to switch inputs. For a change in output signal O6 caused by a change of input signal IN1, the propagation delay through LUT 500 may be the delay for multiplexers 501-516 to switch inputs plus the propagation delay of data through the three levels of multiplexers 520-512, multiplexers 540 and 541, and multiplexer 450. Thus, the propagation delay from input signal IN6 to output signal O6 may be less than the propagation delay from input signal IN1 to output signal O6. IN6 may be the fastest input signal followed in order of increasing propagation delay by IN5, IN4, IN3, IN2, and IN1.

Figure 6A:
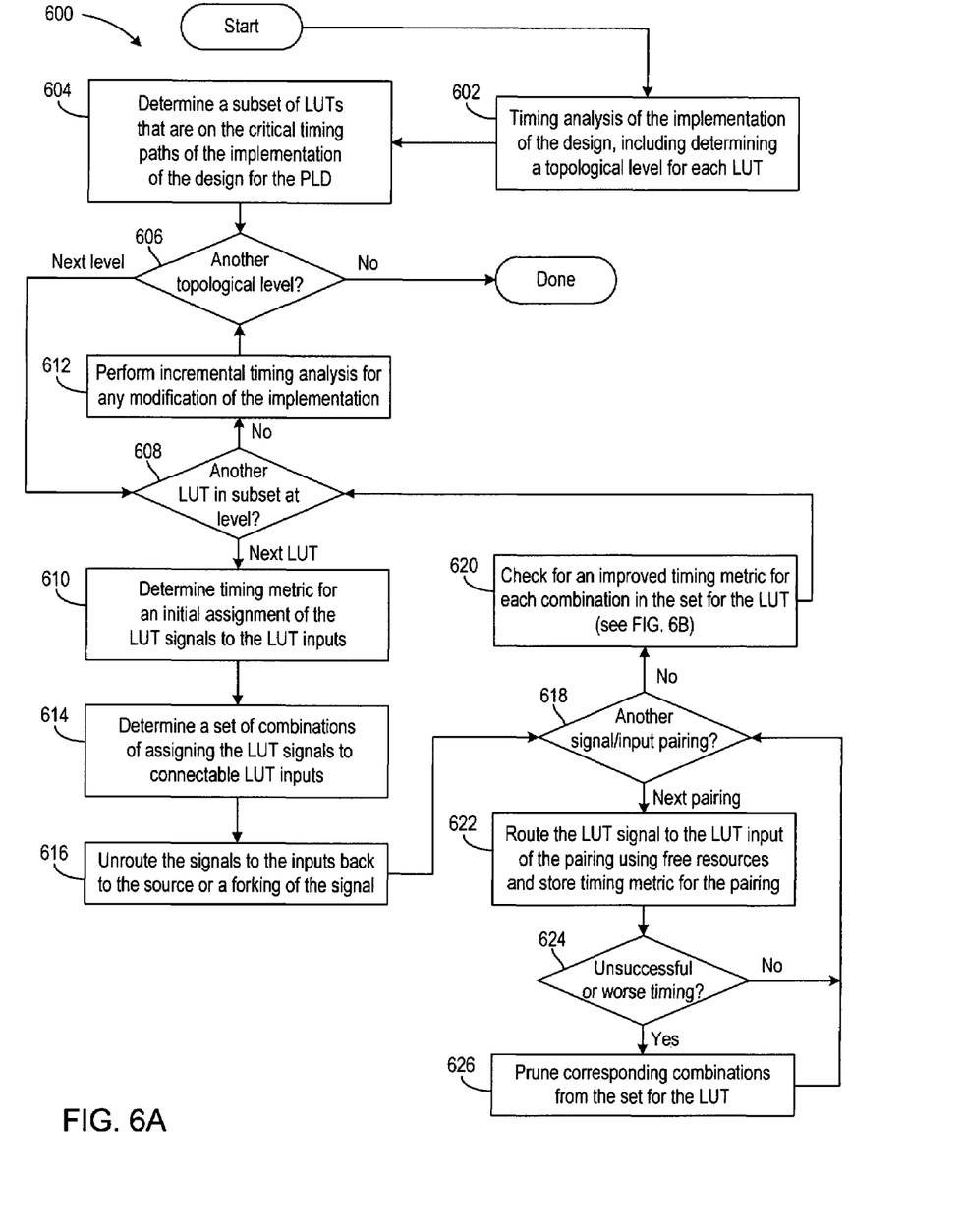
FIGS. 6A and 6B are flow diagrams of another process for improving an implementation of a design in a programmable logic device in accordance with various embodiments of the invention.
Figure 6B:
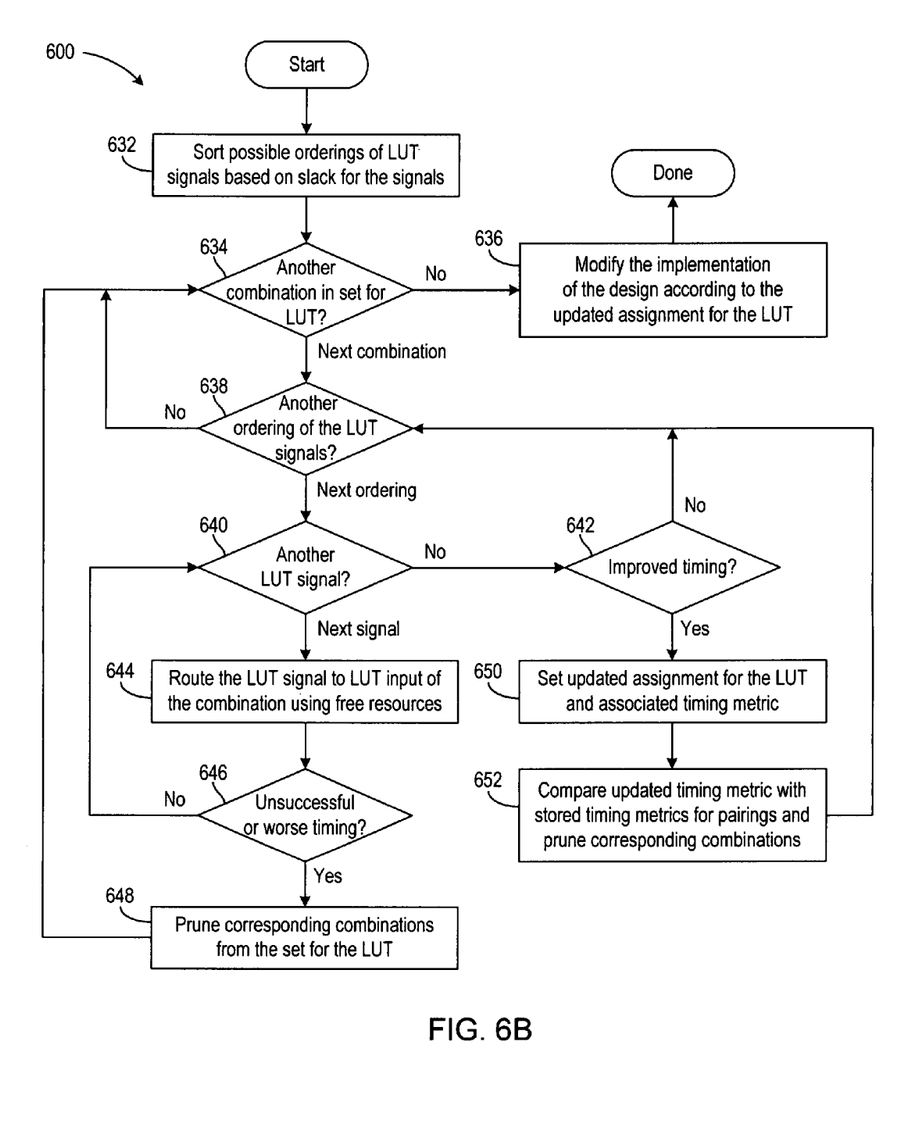

FIGS. 6A and 6B are flow diagrams of another process 600 for improving an implementation of a design in a programmable logic device in accordance with various embodiments of the invention.

At step 602, a timing analysis of an existing implementation of the design may determine the critical timing paths of the existing implementation of the design. The topological level may also be determined for each LUT of the PLD that is used for implementing the design. At step 604, the LUTs are determined that are on one or more of the critical timing paths of the implementation of the design in the PLD.

Decision 606 checks whether the implementation of the design has additional topological levels of LUTs. Process 600 completes when all topological levels of LUTs are processed. If there is an additional topological level of LUTs, process 600 proceeds to decision 608.

Decision 608 checks whether there are additional LUTs to process in the current topological level. If there are additional LUTs, process 600 proceeds to step 610; otherwise, process 600 returns to decision 606, which checks whether there is another topological level with more LUTs, via step 612. At step 612, a timing analysis is performed to reflect any changes made to the implementation of the design in the PLD. The timing analysis may be an incremental timing analysis that reflects the changes to the LUTs in the current topological level.

At step 610, a timing metric may be determined for the current LUT on a critical timing path at the current topological level. The timing metric may be the circuit timing of the worst-case propagation delay from the registers and design inputs to an output of the current LUT. In one embodiment, a timing model for the LUT may account for any differences in propagation delays between the inputs of a LUT by lumping each difference with a routing delay to reach the input of the LUT, such that the timing model has the same propagation delay from each input to an output of the LUT. In such an embodiment, the timing metric may be the worst-case propagation delay from the registers and design inputs to the inputs of the LUT.

The existing implementation of the design in the PLD may assign certain signals to connect to the inputs of the current LUT in the current topological level. At step 614, additional combinations of assignments may be determined that permute the assignments of these signals to the inputs of the LUT. If all of these signals may be connected to every input of the LUT, then the combinations may be all permutations of assigning these signals to the inputs of the LUT. Restrictions may prevent a particular signal from being connected to certain inputs of the LUT. Referring back to FIG. 5, the implementation of an example design may use both outputs O5 and O6 of a LUT, such that a particular signal may connect only to IN6 for this LUT. For another example, a particular signal may connect to both an input of the LUT and other logic within the slice for the LUT, such as a MULTAND gate, and for a signal that connects to the MULTAND gate, the slice may constrain the signal to connect to a specific input or inputs of the LUT. Limiting the combinations of assignments to feasible connections of signals to inputs provides a first level of pruning of the combinations considered in process 600.

To prepare for swapping signals between the inputs of the current LUT, the routing is deleted that connects these signals to the inputs of the current LUT at step 616. The routing may be deleted between the source of the signal and the input of the current LUT. Alternatively, for a signal having fanout to multiple destinations, the routing may be deleted between a forking of the signal and the input of the current LUT. If a particular signal can only be connected to one input of the LUT as determined at step 614, then the routing need not be deleted for this particular signal. Upon completion of deletion of routing, any feasible assignment of signals to inputs may be implemented upon successfully routing the signals to the assigned inputs.

Even though an assignment of a signal to a LUT input is feasible, contention for routing resources may prevent the signal from being routed to the LUT input unless other signals are rerouted. Various embodiments of the invention do not reroute these other signals. Instead, signals are routed to the assigned LUT inputs using routing resources that are unused by the current implementation of the design in the PLD. These free routing resources may include the routing resources that are freed during step 616. Routing signals to assigned LUT inputs using free routing resources may simplify process 600. Upon completion of a routing of signals to assigned LUT inputs for a particular combination, the combination can be readily evaluated to determine whether circuit timing of the implementation is improved. In various embodiments of the invention, the implementation is modified according to the assignment for each combination that improves circuit timing.

A second level of pruning reduces the number of combinations of assignments before completing the routing of any combination. A series of partial routings is attempted with each partial routing connecting a pairing of one of the signals to one of the LUT inputs, while not connecting the other signals and inputs for the LUT. An evaluation of the partial routing can provide a bound on the circuit timing for the combinations of assignments that include the pairing of the signal to the LUT input. If the evaluation indicates that circuit timing becomes worse for the partial routing of a pairing, the combinations may be eliminated that include the pairing of the signal to the input.

Decision 618 checks whether there is another pairing of a signal that may be feasibly connected to an input of the current LUT. If all feasible pairings of signals to inputs have been considered for the LUT, then process 600 proceeds to step 620; otherwise, process 600 proceeds to step 622 to consider the next pairing. At step 622, a routing is attempted that routes the signal for the pairing to the LUT input for the pairing using free routing resources. For each iteration of step 622, the routing attempt begins with unconnected LUT inputs as created at step 616. Thus, each iteration of step 622 attempts to route one signal to one LUT input. If the signal is successfully routed to the LUT input, the circuit timing for the routed signal is compared with a best circuit timing to determine whether the circuit timing for the single routed signal is worse than the best circuit timing already found. The best circuit timing found may be initialized at step 610 with the circuit timing of the current implementation of the design in the PLD. The circuit timing for the pairing may be stored for later use at step 652 as discussed below.

Decision 624 checks the results of the routing attempt. If the routing attempt was unsuccessful or was successful but worsens timing, process 600 proceeds to step 626; otherwise, process 600 returns to decision 618. At step 626, the combinations are pruned that include the current pairing of a signal to a LUT input. This pruning is a second level of pruning of the combinations considered by process 600.

At step 620, the remaining combinations for the current LUT are checked for improvement of the timing metric. The remaining combinations may be pruned further for certain unsuccessfully and certain successfully completed combinations. FIG. 6B may correspond to step 620 of FIG. 6A.

The remaining combinations specify the signals that are assigned for connection to the LUT inputs. For a given combination, the order of routing the signals may affect the quality of the resulting circuit timing. For example, the first signal that is routed may use resources that become unavailable for routing the second signal, such that the resulting circuit timing is worse than if the second signal was routed before the first signal.

At step 632 of FIG. 6B, the order for routing the signals is selected, and this order may be the same for all the combinations. The slack of the signals may be used to determine the ordering of routing the signals. The slack of a signal may be the difference between the worst-case timing path through the signal and a targeted propagation delay for the implementation of the design in the PLD. The slack of the signals may be determined in a manner that is independent of the LUT input to which the signal is connected.

The signal routing order may include all permutations of ordering the signals. Each permutation in the signal routing order may include a first signal to be routed, followed by a second signal to be routed, and so on. The first permutation in the signal routing order may begin with the signal having the least amount of slack, followed by the signal with the next greater amount of slack, and so on. The last permutation in the signal routing order may begin with the signal having the most amount of slack, followed by the signal with the next smaller amount of slack, and so on. The permutations in the signal routing order may be sorted with a primary sort key of the slack for the first signal to be routed, a secondary sort key of the slack for the second signal to be routed, and so on. Thus, the signals with the least slack are preferentially routed first. The signals with the least amount of slack are expected to be more difficult to route, so routing these signals first may permit efficient pruning of combinations and signal routing orders that cannot improve circuit timing.

Decision 634 checks whether all combinations of assignments of signals to LUT inputs are processed. If all combinations are processed, process 600 proceeds to step 636. At step 636, the implementation of the design is modified according to the updated assignment and signal routing order for the LUT. Because the updated assignment is initialized with the assignment from the existing implementation, step 636 might not modify the implementation of the design unless an improved circuit timing for the LUT has been discovered. Process 600 may proceed from step 636 to decision 608 of FIG. 6A.

If there is another combination available at decision 634, process 600 proceeds to decision 638 to process the next combination. Decision 638 checks whether all signal routing orders are processed for the current combination. If there are more signal routing orders, process 600 proceeds to decision 640; otherwise, process 600 returns to decision 634.

Decision 640 checks whether all signals are routed for the current signal routing order of the current assignment. If all signals are routed for the current signal routing order of the current assignment, process 600 proceeds to decision 642; otherwise, process 600 proceeds to step 644. At step 644, the next signal in the signal routing order is routed to the LUT input specified by the current combination. Decision 646 checks whether the routing of the signal has the failure of either an unsuccessful routing or a routing that is successful but worsens circuit timing. If the routing is successful and circuit timing may still be improved, process 600 returns to decision 640 to route the next signal; otherwise, process 600 proceeds to step 648. For a failure at a partially completed routing, the other combinations that have the routed signals assigned to the same LUT inputs may be pruned at step 648 because these combinations would have similar failures if routing was attempted. Pruning these other combinations having the routed signals assigned to the same LUT inputs provides a third level of pruning of the combinations considered in process 600. After the first routing failure is detected, further processing of this combination may be skipped by returning to decision 634.

Decision 642 checks whether the completed routing, which routes the signals in the current routing order to the LUT inputs as assigned by the current combination, results in improved circuit timing for the implementation of the design in the PLD. If circuit timing is not improved, process 600 returns to decision 638 to consider the next signal routing order for the current combination. If circuit timing is improved, process 600 proceeds to step 650. At step 650, an updated assignment is set that improves circuit timing. At step 652, the pruning previously performed at step 626 of FIG. 6A is repeated using the results previously stored at step 626 and the newly improved circuit timing for the updated assignment. This pruning may provide a fourth level or pruning of the combinations considered in process 600.

In one embodiment of the invention, process 600 may be executed twice in two passes that include a first pass with decision 606 selecting increasing topological levels beginning at the first level and a second pass with decision 606 selecting decreasing topological levels beginning at a last level. For the first pass, the timing metric may be the worst-case propagation delay from the registers and design inputs to an output of the current LUT. For the second pass, the timing metric may be the available slack of the timing paths passing through the current LUT. The second pass may provide additional improvements to the implementation of the design in the PLD, especially in the case of a design that includes false paths. It will be appreciated that additional passes may further improve the implementation of the design in the PLD.

Figure 7:
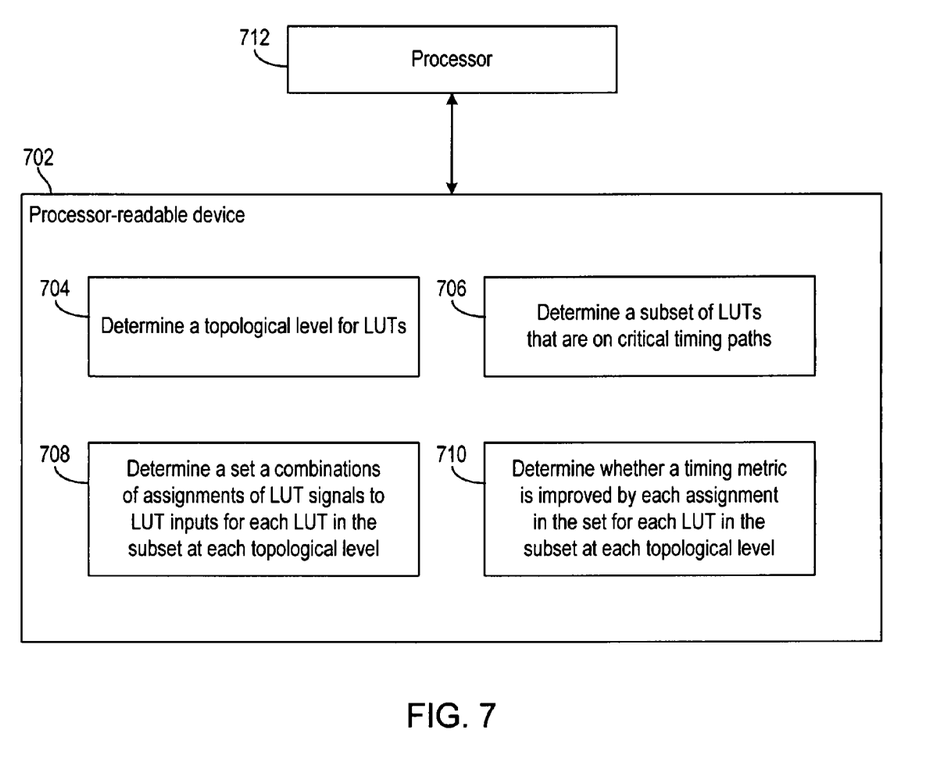
FIG. 7 is a block diagram of a system for improving an implementation of a design in a programmable logic device in accordance with various embodiments of the invention.

FIG. 7 is a block diagram of a system for improving an implementation of a design in a programmable logic device in accordance with various embodiments of the invention.

A processor-readable device 702 may be configured with software modules 704, 706, 708, and 710. Execution of the instructions in modules 704, 706, 708, and 710 may cause processor 712 to improve an implementation of a design in a programmable logic device (PLD). Execution of instructions in module 704 may cause processor 712 to determine a topological level for the LUTs in the implementation of the design of the PLD. Execution of instructions in module 706 may cause processor 712 to determine a subset of the LUTs that are included on the critical timing paths of the implementation of the design for the PLD.

Execution of instructions in module 708 may cause processor 712 to determine a set of combinations for assigning signals to inputs of each LUT in the subset at each topological level of the implementation of the design for the PLD. The signals for the LUT are coupled in the implementation of the design to the inputs of the LUT. A current assignment for the LUT of the signals to the inputs is initialized in correspondence with the implementation of the design for the PLD.

Execution of instructions in module 710 may cause processor 712 to determine whether a respective assignment for each combination in the set improves a timing metric for each LUT in the subset at each topological level. Improvement of the timing metric is relative to the timing metric for a current assignment for the LUT. The current assignment for the LUT may be updated with each assignment that improves the timing metric for the LUT.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable media or delivery channels such as magnetic or optical disks or tapes, electronic storage devices, or as application services over a network.

The present invention is thought to be applicable to a variety of systems for improving an implementation of a design in a PLD. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for improving an implementation of a design in a programmable logic device (PLD), comprising:

determining a topological level of the implementation of the design for each of a plurality of look-up tables (LUTs) of the PLD;

determining a subset of the LUTs that are included on a plurality of critical timing paths of the implementation of the design for the PLD;

for each topological level of the implementation of the design for the PLD, determining, for each LUT in the subset that is at the topological level, a set of combinations of assigning a plurality of signals for the LUT to a plurality of inputs of the LUT, the signals for the LUT coupled in the implementation of the design to the inputs of the LUT, wherein a current assignment for the LUT of the signals for the LUT to the inputs of the LUT is initialized in correspondence with the implementation of the design for the PLD;

for each topological level of the implementation of the design for the PLD, determining, for each LUT in the subset that is at the topological level, whether a respective assignment for each combination in the set for the LUT improves a timing metric for the LUT relative to the timing metric of the current assignment for the LUT, and updating the current assignment for the LUT with the respective assignment in response to improvement of the timing metric for the LUT, wherein an updated assignment results in a modified implementation of the design; and outputting the modified implementation of the design.

2. The processor-implemented method of claim 1, further comprising, for each topological level of the implementation of the design for the PLD, performing a timing analysis of the implementation as accumulatively modified according to the current assignment for each LUT in the subset and at the topological level.

3. The processor-implemented method of claim 1, wherein the determining of the topological level of the implementation of the design for each LUT of the PLD includes generating a topological sort of the implementation of the design for the PLD.

4. The processor-implemented method of claim 3, wherein:

the implementation of the design includes a plurality of registers and a plurality of input ports that are interconnected using a plurality of logic components of the PLD that include the LUTs; and the generating of the topological sort includes determining a topological level for each logic component that is a number of the logic components along a longest path from the registers and the input ports to the logic component.

5. The processor-implemented method of claim 1, wherein the determining of the subset of the LUTs that are included on the critical timing paths includes performing a timing analysis of the implementation of the design for the PLD.

6. The processor-implemented method of claim 5, wherein:

the implementation of the design includes a plurality of registers and a plurality of input and output ports that are interconnected using a plurality of logic components of the PLD that include the LUTs; and the performing the timing analysis includes selecting the critical timing paths as a plurality of paths in the implementation from the registers and the input ports to the registers and the output ports that have a propagation delay that is greater than a target propagation delay.

7. The processor-implemented method of claim 1, wherein the determining of the set of combinations for each LUT in the subset at each topological level includes, for each of the signals for the LUT and each of the inputs of the LUT for which the signal is not connectable to the input, eliminating each combination from the set that corresponds to assigning the signal to the input.

8. The processor-implemented method of claim 1, wherein the determining of the set of combinations for each LUT in the subset at each topological level includes pruning the set of combinations for each LUT in the subset at each topological level in response to the timing metric of the current assignment for the LUT.

9. The processor-implemented method of claim 1, wherein the determining of the set of combinations for each LUT in the subset at each topological level includes removing a routing of the signals for the LUT to the inputs of the LUT in the implementation of the design.

10. The processor-implemented method of claim 9, wherein the removing of the routing of the signals for the LUT to the inputs of the LUT includes removing the routing between each input of the LUT and a respective point for each signal for the LUT that is either a source point of the signal or a forking point of the signal.

11. The processor-implemented method of claim 9, wherein the determining of the set of combinations for each LUT in the subset at each topological level further includes separately attempting to route each of the signals to each of the inputs using interconnect resources of the PLD that are not used by the implementation of the design following the removing of the routing of the signals to the inputs.

12. The processor-implemented method of claim 11, wherein the determining of the set of combinations for each LUT in the subset at each topological level further includes eliminating each combination from the set that assigns to a signal for the LUT to an input of the LUT for which the separately attempting to route the signal to the input is unsuccessful.

13. The processor-implemented method of claim 11, wherein the determining of the set of combinations for each LUT in the subset at the topological level further includes eliminating a combination from the set in response to the combination assigning a signal for the LUT to an input of the LUT for which the separately attempting to route the signal to the input produces a routing with a first value of the timing metric for the LUT that is worse than a second value of the timing metric of the current assignment for the LUT.

14. The processor-implemented method of claim 13, wherein the determining of the set of combinations for each LUT in the subset at the topological level further includes storing the first value of the timing metric of the combination for the LUT and eliminating the combination from the set in response to the current assignment for the LUT being updated and the first value of the timing metric of the combination for the LUT being worse than a value of the timing metric as improved by the respective assignment that updates the current assignment.

15. The processor-implemented method of claim 9, wherein the determining of the set of combinations for each LUT in the subset at each topological level further includes, for each combination in the set for the LUT, consecutively attempting to route each of the signals for the LUT to a respective one of the inputs of the LUT as assigned by the combination, the consecutively attempting to route the signals for the LUT including consecutively attempting to route the signals for each of a plurality of orderings of the signals using interconnect resources of the PLD that are not used by the implementation of the design following the removing of the routing of the signals to the inputs.

16. The processor-implemented method of claim 15, wherein the determining of the subset of the LUTs that are included on the critical timing paths of the implementation of the design for the PLD includes determining a slack for each of the critical timing paths, and consecutively attempting to route the signals for each of the orderings of the signals for the LUT includes determining the orderings of the signals for the LUT in response to the slack of each of the critical timing paths that include the LUT.

17. The processor-implemented method of claim 1, wherein the determining of whether the respective assignment, for each combination in the set for each LUT in the subset and at each topological, improves a timing metric for the LUT includes determining the timing metric for the LUT that is either a minimum timing slack for a plurality of timing paths passing through the LUT or a maximum arrival time, which includes relative differences between a propagation time through the LUT for each of the inputs of the LUT, for the signals for the LUT at the inputs of the LUT.

18. The processor-implemented method of claim 1, further comprising generating the implementation of the design in the PLD as accumulatively modified according to the current assignment for each LUT in the subset.

19. A program storage medium, comprising:

a processor-readable device configured with instructions for improving an implementation of a design in a programmable logic device (PLD), wherein execution of the instructions by one or more processors causes the one or more processors to perform operations including, determining a topological level of the implementation of the design for each of a plurality of look-up tables (LUTs) of the PLD, determining a subset of the LUTs that are included on a plurality of critical timing paths of the implementation of the design for the PLD, for each topological level of the implementation of the design for the PLD, determining, for each LUT in the subset that is at the topological level, a set of combinations of assigning a plurality of signals for the LUT to a plurality of inputs of the LUT, the signals for the LUT coupled in the implementation of the design to the inputs of the LUT, wherein a current assignment for the LUT of the signals for the LUT to the inputs of the LUT is initialized in correspondence with the implementation of the design for the PLD, for each topological level of the implementation of the design for the PLD, determining, for each LUT in the subset that is at the topological level, whether a respective assignment for each combination in the set for the LUT improves a timing metric for the LUT relative to the timing metric of the current assignment for the LUT, and updating the current assignment for the LUT with the respective assignment in response to improvement of the timing metric for the LUT, wherein an updated assignment results in a modified implementation of the design, and outputting the modified implementation of the design.

20. A system for improving an implementation of a design in a programmable logic device (PLD), the system comprising:

means for determining a topological level of the implementation of the design for each of a plurality of look-up tables (LUTs) of the PLD;

means for determining a subset of the LUTs that are included on a plurality of critical timing paths of the implementation of the design for the PLD;

means for determining, for each topological level of the implementation of the design for the PLD, and for each LUT in the subset that is at the topological level, a set of combinations of assigning a plurality of signals for the LUT to a plurality of inputs of the LUT, the signals for the LUT coupled in the implementation of the design to the inputs of the LUT, wherein a current assignment for the LUT of the signals for the LUT to the inputs of the LUT is initialized in correspondence with the implementation of the design for the PLD;

means for determining, for each topological level of the implementation of the design for the PLD, and for each LUT in the subset that is at the topological level, whether a respective assignment for each combination in the set for the LUT improves a timing metric for the LUT relative to the timing metric of the current assignment for the LUT, and for updating the current assignment for the LUT with the respective assignment responsive to improvement of the timing metric for the LUT, wherein an updated assignment results in a modified implementation of the design; and means for outputting the modified implementation of the design.

\* \* \* \* \*